Oct. 10, 1950
G. H. WRIGHT ET AL
2,525,086
LIGHTING CONNECTION FOR TRAILERS
Filed Jan. 28, 1946
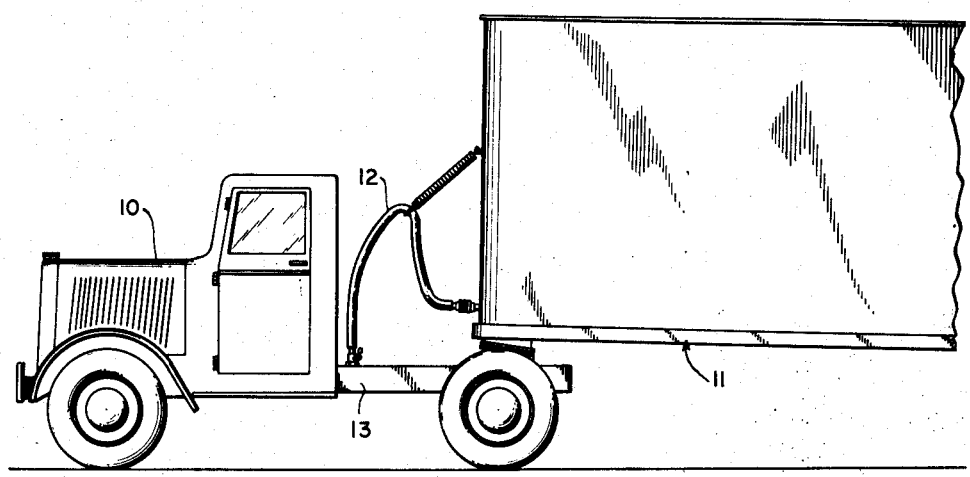
FIG. 1
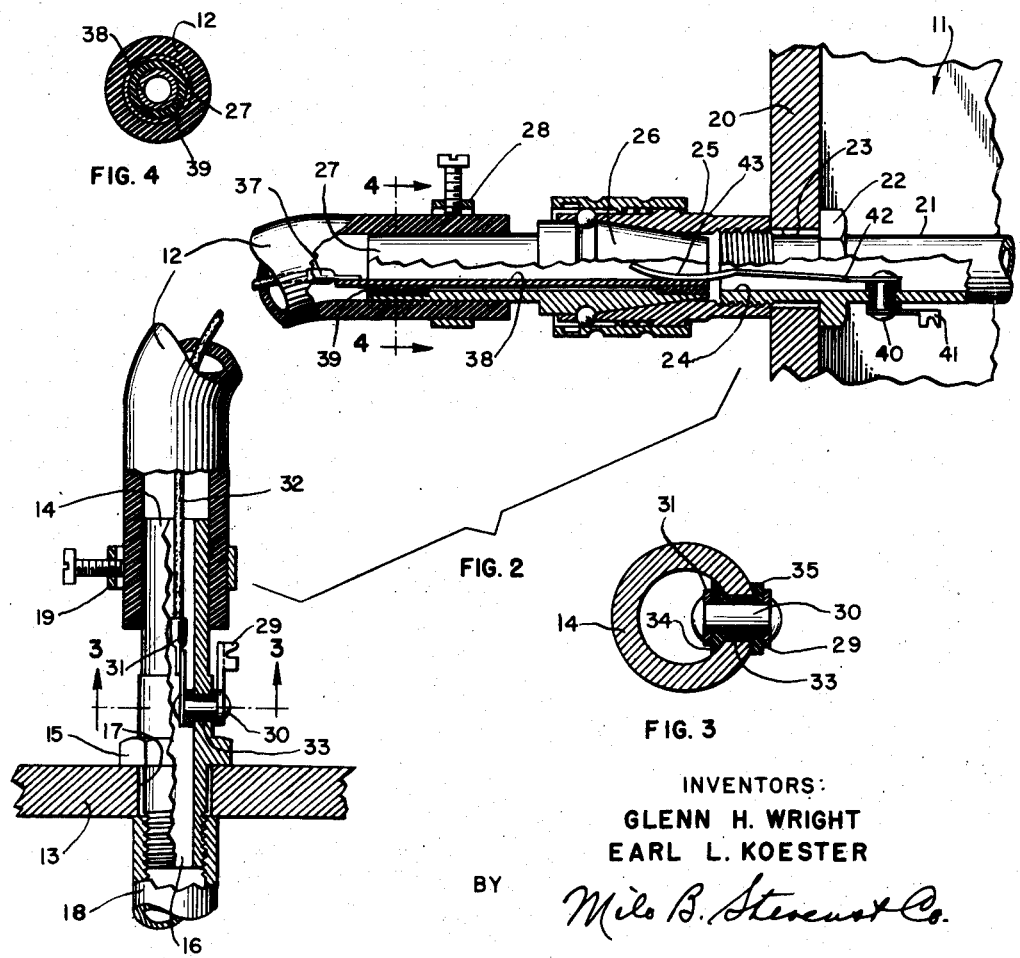
INVENTORS:
GLENN H. WRIGHT
EARL L. KOESTER
BY Milo B. Stevens & Co.
ATTORNEYS.

Patented Oct. 10, 1950

2,525,086

UNITED STATES PATENT OFFICE 2,525,086

LIGHTING CONNECTION FOR TRAILERS

Glenn H. Wright and Earl L. Koester, Aurora, Ill.

Application January 28, 1946, Serial No. 643,887

6 Claims. (Cl. 173—326)

Our invention relates to connections leading from motor trucks or tractors to trailers for the purpose of operating the lights carried by the latter. While the negative or ground line of the truck lighting system is ordinarily transmitted to the trailer by joining frame portions of two vehicles, the positive line passes from the truck to the trailer in the form of an insulated cable or wire. The connections of such a cable or wire, being usually exposed to the weather, often become defective from vibration or corrosion, to the end that the trailer lights get out of order when least expected, creating a legal and safety hazard.

In view of the above situation, one object of the present invention is to provide a positive line connection which is firmly secured and protected from climatic exposure.

A further object is to provide a connection which employs the brake-system air line between the vehicles as a housing and conduit, thus securing maximum protection from moisture and dust.

Another object is to include a simple and highly efficient joint in the connection which is separable when the air line is disconnected.

An important object is to design the novel connection with few and simple parts and for easy installation and access.

With the above objects in view and any others which may suggest themselves from the description to follow, a better understanding of the invention may be had by reference to the accompanying drawing, in which—

Fig. 1 is a side view of the main portion of a truck-trailer assembly, showing the improved connection;

Fig. 2 is a group section, showing the end portions of the connection on a larger scale; and Figs. 3 and 4 are, respectively, sections on the lines 3—3 and 4—4 of Fig. 2.

In accordance with the foregoing, specific reference to the drawing indicates the truck at 10, the trailer at 11, and the air line hose between them at 12. The air line connection to the truck is usually made permanent, while that to the trailer is separable.

The lower portion of Fig. 2 shows the air line connection to the truck frame 13. A metal tube 14 is seated with a hexagonal enlargement 15 on the frame, and has a threaded nipple 16 extending through an opening 17 in the same to receive the truck air pipe 18. The tube 14 receives one end portion of the air hose 12, which is made fast by a standard hose clamp 19.

The upper part of Fig. 2 shows the air line connection to the trailer frame 20. Thus, the trailer air pipe 21 seats with a hexagonal enlargement 22 against the frame 20 and extends through an opening 23 in the same with a threaded nipple 24. The latter receives the socket 25 of a standard air line coupling in which the co-acting element is a hollow conical plug 26 having a tubular shank 27. The latter receives the other end portion of the air hose 12, which is secured by a clamp 28.

The air line construction just described is standard, and well understood in the art, with the tubular cone 26 releasably connected with the socket 25 and with the cone and socket revoluble with respect to each other when connected. By our invention, a novel arrangement of parts is employed, mounted within the air line for effecting a positive connection of the leads of the lighting system.

The positive lighting circuit cable of the truck (not shown) is attachable to a conventional connecting lug 29 carried by a rivet 30. The latter enters the wall of the tube 14 to extend with a coupling 31 to which one end of the positive wire 32 designed to extend from the truck to the trailer is fastened. As is more clearly shown in Fig. 3, the rivet 30 is insulated from the tube 14 by a medial sleeve 33 and terminal washers 34 and 35, these parts being of rubber or other suitable insulating material. To insure an air and moisture tight connection, the washers 34 and 35 are convex and concave, respectively, where they engage the wall of the tube 14, making a hermetical seal therewith.

In respect to the unit in the upper portion of Fig. 2, the other end of the positive wire 32 enters the tubular shank 27 with a terminal coupling 37 soldered to one end of a metal tube 38 disposed concentrically within the shank 27. The tube 38 is spaced from the wall of the latter by a pair of insulation rings 39 lodged in the ends of the shank 27, being electrically insulated from the same in this manner. The trailer air pipe 21 carries a wall rivet 40 insulated in the same manner as the rivet 30 in the previous instance and also having an external connecting lug 41 for the attachment of the trailer positive lighting system cable (not shown). However, the rivet 40 is extended from its inner end with a spring blade 42 having a spoon-like end portion 43 in frictional engagement with the related end portion of the internal tube 38. The electrical connection is thus completed between the truck and trailer lighting systems.

The features of the improved lighting connection will now be summarized. First, an airtight and weatherproof entrance of the current leads from the truck and the trailer into the air line is procured by means of the insulated rivets 30 and 40. Further, the internal wire 32 is wholly encased in the air line hose 12 and protected from dust and climatic exposure, it being understood that such wire will be amply insulated or armored to withstand strain or injury from vibration or friction with surfaces on the inside of the air line. Further, the internal tube 38 always offers a contacting surface to the end portion 43 of the spring blade 42, whatever the position may be to which the tube has been rotated. Further, the tube 38 is carried by one element of the air line coupling, while the spring blade 42 is carried by the companion element thereof. The electrical connection is thus automatically severed when the trailer is disconnected from the truck; and the cam-like form of the end portion 43 facilitates the instant joining of the electrical connection when the air line is coupled. A connection is thus had which uses the air line for a housing and conduit, and is designed to be connected and disconnected jointly with the air line—and without separate attention—when the truck and trailer brake and electric systems are to be coupled or uncoupled. Finally, the novel connection is very simple and capable of being installed in the air line at a moderate expense.

While we have described the invention along specific lines, various minor changes or refinements may be made therein without departing from its principle, and we desire to consider such changes and refinements as coming within the scope and spirit of the appended claims.

We claim:

1. In an electrical coupling for vehicle members, metallic air line pipes on the vehicles at their adjacent end portions, a flexible conduit connecting said air line pipes, a tubular cone connected with one end of said conduit making a releasable connection with a socket member carried by one of the air line pipes, a circuit lead comprising a terminal member carried by said cone, means extending through said conduit and electrically connecting said terminal member with a circuit member on one of said vehicles, and a spring blade mounted on the other vehicle in position to extend into said tubular cone into frictional engagement with said terminal member.

2. The structure of claim 1, said terminal member being a tube concentrically within and rotatable with said cone, and the engaging portion of said blade being spoon-shaped to enter said tube with facility on the assembling of the joint and to maintain effective engagement with the tube upon rotary movement of the cone and the socket with respect to each other.

3. The structure of claim 1, said terminal member being a tube concentrically within and rotatable with said cone, the engaging portion of said blade being spoon-shaped to enter said tube with facility on the assembling of the joint and to maintain effective engagement with the tube upon rotary movement of the cone and the socket with respect to each other, and insulation means between the tube and the tubular cone.

4. The structure of claim 1, said terminal member being a tube concentrically within and rotatable with said cone, the engaging portion of said blade being spoon-shaped to enter said tube with facility on the assembling of the joint and to maintain effective engagement with the tube upon rotary movement of the cone and the socket with respect to each other, and insulation rings in the ends of the tubular cone and maintaining the tube in separated relation to the tubular cone.

5. In an electrical coupling for vehicle members, metallic air line pipes on the vehicles at their adjacent end portions, a flexible conduit connecting said air line pipes, a tubular cone connected with one end of said conduit making a releasable connection with a socket member carried by one of the air line pipes, a metallic tube extending longitudinally of said tubular cone and electrically insulated therefrom, a lead connected to one of said air line pipes, said lead passing through said conduit and connected to said longitudinal metallic tube, and a spring metal contact blade mounted in said socket and electrically insulated therefrom, said blade extending longitudinally of the socket in a position to press yieldingly against the inner face of the tube.

6. The structure of claim 5, said spring blade being spoon-shaped, and insulated attaching means on the outside of said metallic air line pipes for the respective wire connections and extending through the pipes to the interior thereof.

GLENN H. WRIGHT.
EARL L. KOESTER.

REFERENCES CITED

The following references are of record in the file of this patent:

UNITED STATES PATENTS

| Number | Name | Date |
|---|---|---|
| 307,535 | Flad | Nov. 4, 1884 |
| 469,283 | Strauss | Feb. 23, 1892 |
| 1,223,864 | French | Apr. 24, 1917 |
| 2,103,758 | Seyfried | Dec. 28, 1937 |

FOREIGN PATENTS

| Number | Country | Date |
|---|---|---|
| 28,720 | England | of 1910 |